M. MATHY.
REGENERATIVE FURNACE.
APPLICATION FILED SEPT. 21, 1920.
1,404,626.
Patented Jan. 24, 1922.
5 SHEETS—SHEET 1.
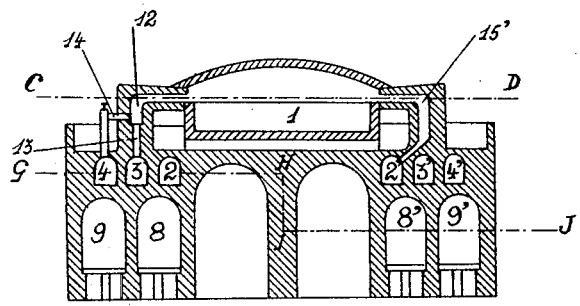
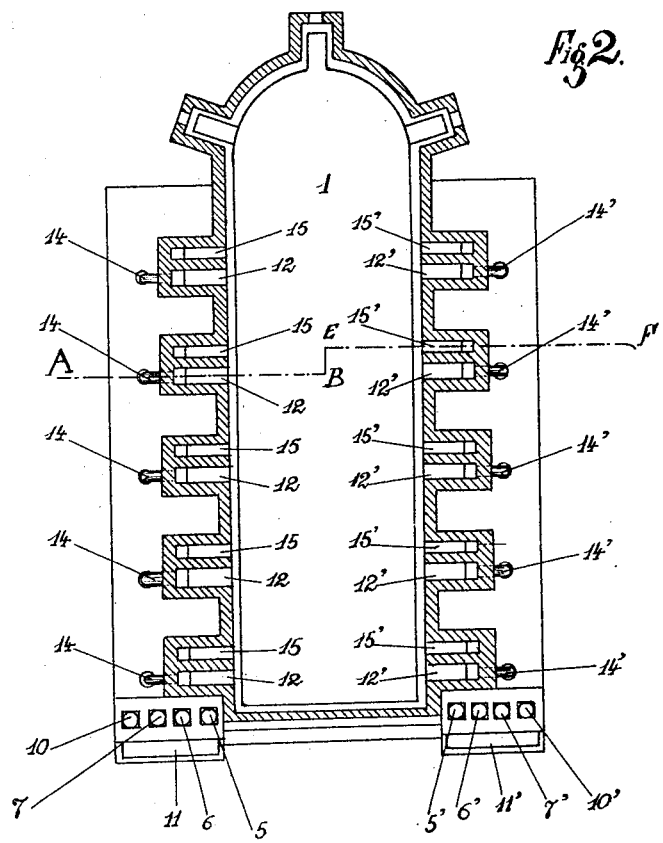
Inventor:
Maurice Mathy
By Lawrence Langner
Attorney.

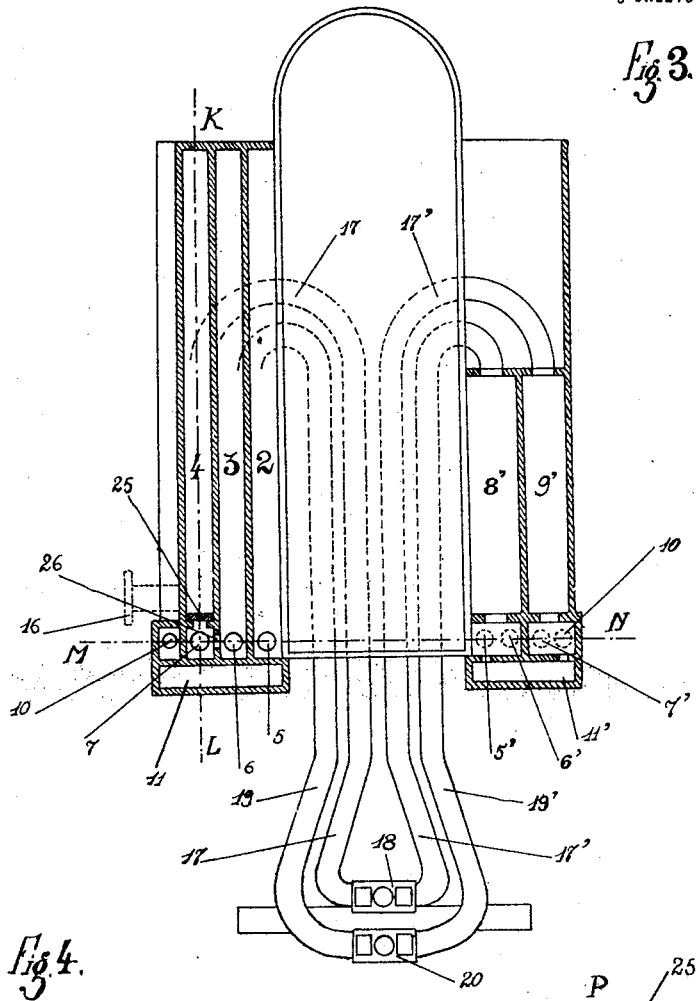
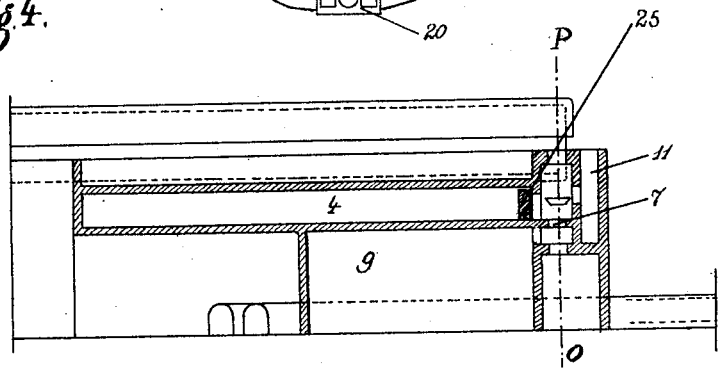

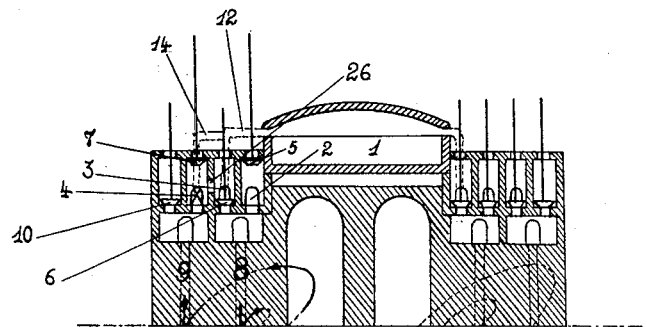

Inventor:
Maurice Mathy
By Lawrence Langner
Attorney.

UNITED STATES PATENT OFFICE.

MAURICE MATHY, OF LIEGE, BELGIUM.

REGENERATIVE FURNACE.

1,404,626.   Specification of Letters Patent.   Patented Jan. 24, 1922.

Application filed September 21, 1920. Serial No. 411,791.

*To all whom it may concern:*

Be it known that I, MAURICE MATHY, manufacturer, a subject of the King of Belgium, and resident of Liege, in the Kingdom of Belgium, have invented certain new and useful Improvements in Regenerative Furnaces; and I do hereby declare the following to be a full, clear, and exact description of the invention, such as will enable others skilled in the art to which it appertains to make and use the same, reference being had to the accompanying drawings, and to letters or figures of reference marked therein, which form a part of this specification.

The present invention relates to a regenerative furnace in which the regenerators are alternately traversed by the hot combustion gases and by one or other of the gases of the combustible mixture. This furnace comprises on each side of the combustion chamber conduits or passages forming burners and conveying the combustible mixture.

According to this invention at the side of each conduit forming a burner by which the combustible mixture is supplied, is arranged a conduit or passage by which the hot gases of combustion are conveyed away. This arrangement, which offers numerous advantages, enables the furnace to be operated in three different ways:

(1). The flames issuing from the burner conduits or passages located at one side of the combustion chamber pass across the said chamber and enter the discharge conduits for the hot gases located at the other side of the combustion chamber.

(2). The flames from the burner conduits at one side of the combustion chamber extend into the said chamber and enter the discharge conduits for the hot gases situated on the same side of the combustion chamber.

(3). The flames issue simultaneously from the burner conduits on both sides of the combustion chamber and simultaneously penetrate into the discharge conduits of the hot gases located at both sides of the said chamber.

Amongst the advantages resulting from the arrangement according to the present invention the following may be mentioned:

(1) The hot gases of combustion which pass to the regenerators do not use the burner conduits which obviates modifications in the direction and place of origin of the flames.

(2) The fact that the burner conduits are only traversed by the combustible mixture, and never by the hot combustion gases, enables these burners to be constructed with great precision. They may thus be built in such a way that the hottest part of the flame is situated a little beyond the mouth of the burner. An arrangement may be adopted for this purpose in which the gases of the combustible mixture are brought together in a vertical conduit prolonged at its upper part by a horizontal conduit opening into the combustion chamber, this horizontal passage being of such a length that the hottest part of the flame is situated a little beyond the mouth of the burner.

The accompanying drawings illustrate, by way of example, one mode of carrying the invention into effect, as applied to a trough furnace. In these drawings:—

Fig. 1 is a cross section through the furnace on the line A B E F of Fig. 2.

Fig. 2 is a cross section of the furnace on the line C D of Fig. 1.

Fig. 3 is a horizontal section on the line G H I J of Fig. 1.

Fig. 4 is a vertical section on K L of Fig. 3.

Figs. 5 to 10 are diagrammatic vertical sections on the line M N of Fig. 3 and O P of Fig. 4. In front of these sections the passages traversed by the air, the gas and the products of combustion are shown diagrammatically.

These figures show the position of the reversing valves and valves during each of the three modes of working the furnace and the reverse modes of working.

Figure 5:
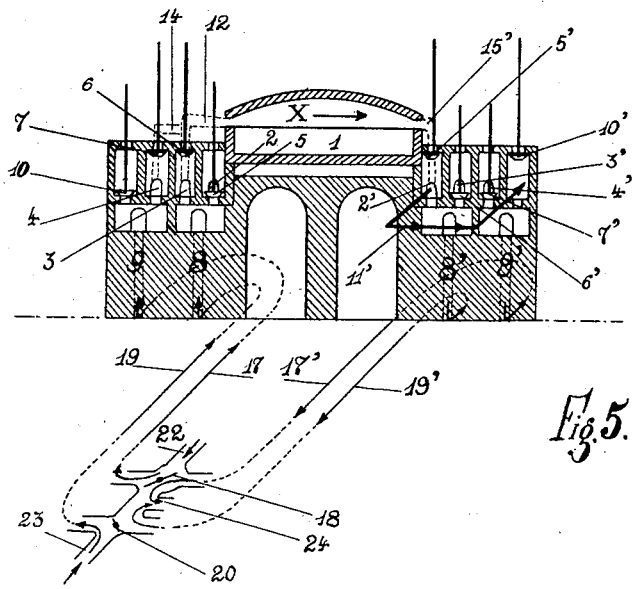
Figure 6:
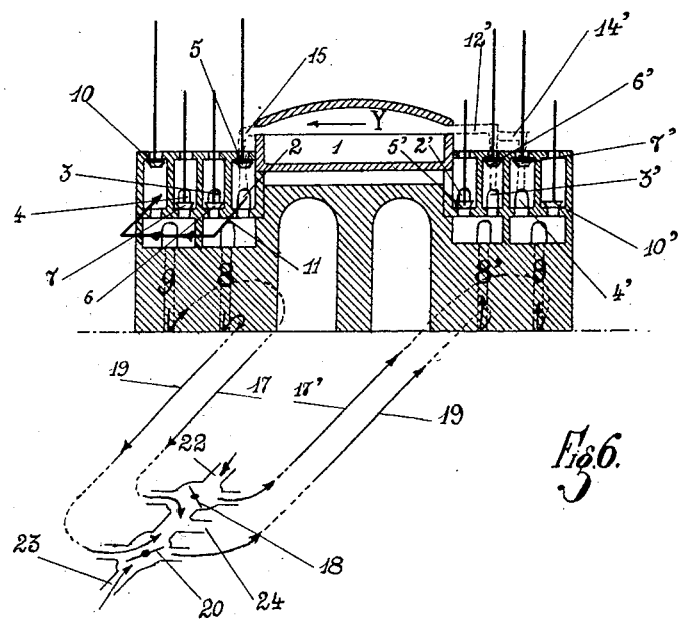
Figure 9:
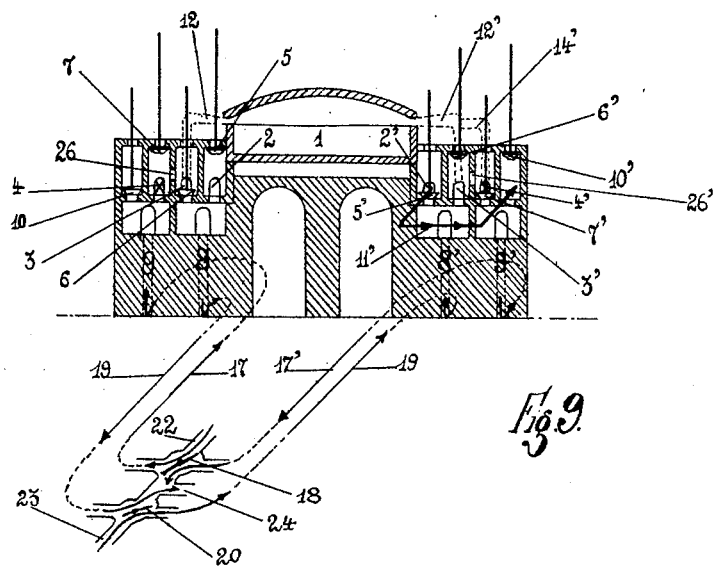
Figure 10:
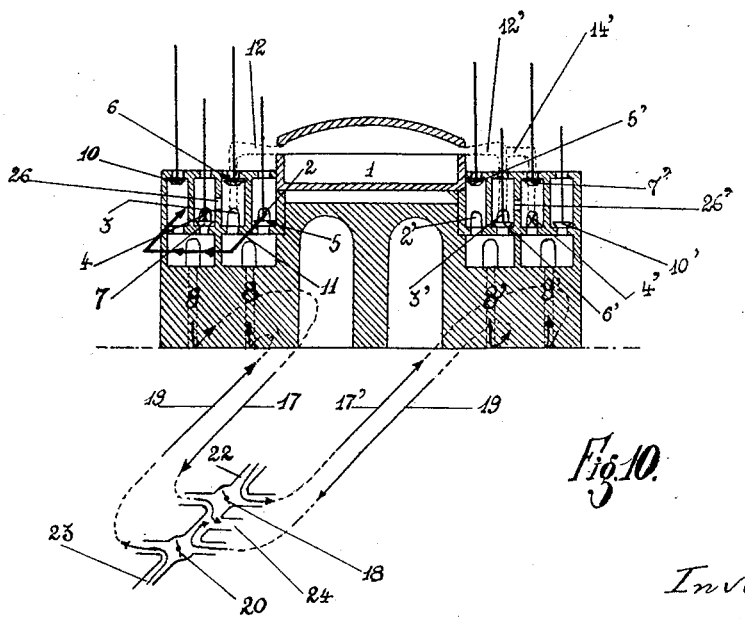

Figs. 5 and 6 relate to one mode, Figs. 7 and 8 to another, and Figs. 9 and 10 relate to a third.

The furnace consists of a basin or trough 1 having along the two opposite sides the burners 12 and 12'. At the side of each of these burners a conduit or passage such as 15 or 15' is provided for conveying away the hot combustion gases. This arrangement enables the three modes of operation hereinbefore specified to be carried out. It is combined with an arrangement of flues, reversing valves and valves hereinafter described.

On each side of the trough 1 are arranged three flues, respectively marked 2, 3, 4 and 2', 3', 4', for introducing the gases of the combustible mixture and carrying away the burnt gases. Under each of these groups of three flues two regenerators 8, 9 and 8', 9' are placed. The flues 2 and 3 communicate with the regenerator 8 by the valves 5 and 6; the flue 4 communicates with the regenerator 9 by a valve 7. This regenerator 9 is, furthermore surmounted by a valve 10, into which the gases from the flue 2 are introduced by a passage 11. Similarly, on the other side of the furnace, the flues 2' and 3' communicate with the regenerator 8' by the valves 5' and 6' and the flue 4' communicates with the regenerator 9' by a valve 7'. This regenerator 9' is surmounted by a valve 10' into which the gases from the flue 2' are introduced by the passage 11'. In all the figures the arrows indicate the valve seated on the valve seats.

In the diagrammatic Figures 5 to 10 the flues 11 and 11', which in reality are situated in front of the plane of the section, are represented by large arrows. In these figures only the flues 11 and 11' traversed by a gas current are indicated.

Of the flues 2, 3, 4 and 2', 3', 4' the flues 3 and 3' are for conveying air for combustion, the flues 4 and 4' are for the combustible gas, and the flues 2 and 2' carry away the hot combustion gases. The conduits 13 and 13' connecting with the flues 3 and 3' convey air to the burners 12 and 12', while the conduits 14 and 14' connecting with the flues 4 and 4' convey gas to these same burners 12 and 12'.

The conduits 15 and 15' opening into the combustion chamber 1 communicate with the flues 2 and 2', and there receive the hot combustion gases.

The gas introduced into the flues 4 and 4' may have been previously heated in the regenerators 9 and 9', for example, or may be conveyed there by passages such as 16 shown in broken lines in Fig. 3. The air conveyed in the flues 3 and 3' is previously heated either in the regenerators 8 and 8' or in 9 and 9'.

Into the regenerators 9 and 9' open the passages 17 and 17', which both terminate at a reversing valve 18, and similarly the passages 19 and 19' open into the regenerators 8 and 8', and terminate at the reversing valve 20.

The reversing valves 18 and 20 both communicate with a chimney 24 (see Figs. 5 to 10). The valve 18 is supplied by a passage 22 and the valve 20 by a passage 23.

As has been already stated, a furnace constructed according to this invention may operate in three different ways.

Figs. 5 and 6 relate to the first method, in which the flames issue from the burners 12 or 12' situated at one side of the combustion chamber, and the hot gases of combustion escape by the conduits 15' or 15 at the other side of the combustion chamber.

Fig. 5 refers to the case in which the flames issue from the burners 12, Fig. 6 to the reverse method in which the flames issue from the burners 12'. The methods of Figures 5 and 6 will be utilized alternately in order to re-heat the regenerators that have given up their heat to the combustible mixture. In the first method of operation the air and gas are both previously heated.

The reversing valve 18 is supplied by gas passage 22; the valve 20 by the air passage 23.

The position of the reversing valves 18 and 20 and the valves 2, 3, 4, 10 and 2', 3', 4', 10', shown in Fig. 5 gives the course to the gases hereinafter described.

The gas from the reversing valve 18 is conveyed by the passage 17 to the regenerator 9 where it is heated; it then traverses the open valve 7 and penetrates into the flue 4 from whence it is distributed to the burners 12 by the conduits 14.

The air from the reversing valve 20 is conveyed by the passage 19 to the regenerator 8 where it is heated; it then traverses the open valve 6 and enters the flue 3, from whence it is distributed to the burners 12 by the conduits 13.

The flames from the burners 12 pass across the combustion chamber as shown by the arrow X.

The hot combustion gases escape from the chamber 1 by the conduits 15' which convey them to the flue 2'.

A part of these gases is directed by the passage 11' towards the valve 10', which is open, and allows this portion of the hot gases, to enter into the regenerator 9'. The other part of the hot gases passes directly to the regenerator 8' by the valve 5', which is open. After having traversed and consequently reheated the regenerators 8' and 9' the combustion gases flow by the passages 17' and 19' and the reversing valves 18 and 20 to the chimney 24.

In order to reverse the working, and consequently to cause the hot gases of combustion to pass through the regenerators 8 and 9, it suffices to operate the reversing valves 18 and 20, to open the valves 5, 10, 6' and 7' which were closed in the mode of operation shown in Fig. 5, and to close the valves 5, 4, 5' and 10' which were open in Fig. 5. The reversing valves and valves then occupy the positions shown in Fig. 6. From an inspection of this figure, the course of the gases will be easily understood. In the combustion chamber 1 the flame will be directed according to arrow Y instead of according to arrow X, as in Fig. 5.

Figures 7 and 8 relate to the second mode of working, in which the flames issue from the burners 12 or 12' located at one side of the combustion chamber, the hot gases of combustion escaping by the conduits, 15 or 15' on the same side of the combustion chamber.

Figures 7 and 8 refer to the case where the flames issue from the burners 12. In operating according to Fig. 8, the regenerator 9 having given up its heat when working as in Fig. 7, is reheated by the hot combustion gases. The modes of working as in Figs 7 and 8 are alternately used.

In the case of Figs. 7 and 8 only the left side of the furnace is utilized; of course the right side only of the furnace could be used. In this latter case the flames would issue from the burners 12'.

In the second method of working, of which it is a question in Figs. 7 and 8, the air alone is preliminarily heated, the reversing valves 18 and 20 are both supplied with air, and the gas is conveyed into the flue 4 by the conduit 16, shown in broken lines in Fig. 3.

The position of the reversing valves 18 and 20 and of the valves 2, 3, 4 shown in Fig. 7 gives the course of the gases hereinafter described. For this purpose it is necessary to close the communication between the valve 7 and the flue 4 and to establish communication between this valve 7 and the flue 3. Communication between the valve 7 and the flue 4 can be cut off by means of a wall such as 25 shown in dotted lines in Figs. 3 and 4.

To establish communication between the valve 7 and the flue 3 it suffices to pierce the separating wall at 26.

The gas brought by the passage 16 to the flue 4 is distributed by the conduits 14 to the burners 12.

The air from the reversing valve 18 is led by the passage 17 to the regenerator 9 where it is heated; it then traverses the valve 7, passes through the opening 26 above the closed valve 6 and enters the flue 3, whence it is distributed to the burners 12 by the conduits 13.

The flames from the burners 12 spread into the combustion chamber 1. The hot gases of combustion pass away by the conduits 15 situated at the same side of the combustion chamber as the burners 12. These conduits 15 convey the hot gases into the flue 2, from whence they pass by the open valve 5 into the regenerator 8. After having reheated this regenerator, the combustion gases are directed towards the chimney 24 by the conduit 19 and the reversing valve 20.

To reverse the working, and consequently to cause the hot gases of combustion to pass through the regenerator 9, the reversing valves 18 and 20 are operated, the valves 6 and 10 which were closed in Fig. 7 are opened, and the valves 5 and 7 which were opened in Fig. 7 are now closed. The valves then occupy the position shown in Fig. 8. The course of the gases will be easily understood from an inspection of this figure. The flame takes the same course in the combustion chamber as in Fig. 7; in Fig. 8 only the course of the gases is changed. In the case of Fig. 8 the air traversing the regenerator 8 passes through the open valve 6 to reach the flue 3, the valve 5 is closed, consequently the hot gases of combustion from the flue 2 traverse the passage 11 and enter the regenerator 9 by the open valve 10.

Figs. 9 and 10 refer to the third mode of working, in which the flames issue simultaneously from the burners 12 and 12', the hot gases of combustion being carried away simultaneously by the conduits 15 and 15'.

In this method of working, when the reversal of the current of gases takes place, the direction of flow of the flame and the hot gases in the combustion chamber remains unchanged.

This method of working differs from the second one in that the right and left sides of the furnace function simultaneously, while in the second method only one of the sides is in operation.

In these figures, the positions and operation of the valves are quite similar to those in Figs. 7 and 8. The working of the arrangement will consequently be easily understood by an inspection of Figs. 9 and 10.

It will be seen in Fig. 1 that the burners are formed by a vertical conduit to which the air and gas are conveyed by the conduits 13 and 14, this vertical conduit being prolonged in its upper part by a substantially horizontal conduit 12 opening into the combustion chamber 1. The length of this horizontal conduit is such that the hottest part of the flame is located near the mouth of the burner.

What I claim is:

1. A regenerative furnace, comprising a combustion chamber, a pair of regenerators arranged on each side of the combustion chamber, conduits on each side of the furnace and communicating with the respective pairs of regenerators for the introduction of the combustible gases and for exhausting the burnt gases, a set of three flues above each pair of regenerators, exhaust conduits on each side of the combustion chamber leading from said chamber to one of each set of flues, and valve-controlled means for establishing communication between said last-mentioned flues and one or both of each pair of regenerators, the other two flues of each set communicating by valve-controlled means the one with one of the regenerators on the corresponding side of the furnace and the other with the other of said regenerators, the construction being such that the hot gases of combustion in passing from the combustion chamber to the regenerators never traverse the flues which conduct the gases of the combustible mixture from the regenerators, and vice versa.

2. A regenerative furnace as set forth in claim 1 in which the combustible gases are conducted to the combustion chamber by a plurality of burners, with each of which is associated one of said exhaust conduits, said burner and conduit of each pair being arranged side by side, and certain of said exhaust conduits being adapted to be put out of service while the others thereof are in service and vice versa.

3. A regenerative furnace as set forth in claim 1 in which the combustible gases are conducted to the combustion chamber by a plurality of burners, with each of which is associated one of said exhaust conduits, said burner and conduit of each pair being arranged side by side, the construction embodying a valve system whereby the combustible gases can be introduced into the combustion chamber at one side thereof, and the burnt gases exhausted from the other side thereof, or the combustible gases can be introduced into the combustion chamber at one side thereof and the burnt gases exhausted from the same side thereof, or the combustible gases can be introduced at both sides of the combustion chamber and the burnt gases exhausted from both sides thereof.

4. A regenerative furnace as set forth in claim 1 in which the combustible gases are conducted to the combustion chamber by a plurality of burners, each comprising a vertical conduit in which the combustible gases are brought together and which is prolonged by a horizontal conduit opening into the combustion chamber and of a length such that the hottest part of the flame is at the entrance of the burner into the combustion chamber.

In testimony whereof I affix my signature in presence of two witnesses.

MAURICE MATHY.

Witnesses:
J. WEATHCLEF,
O. L. MERCHIL.